(12) United States Patent
Shellenberger et al.

(10) Patent No.: US 11,841,103 B2
(45) Date of Patent: Dec. 12, 2023

(54) PIPE ASSEMBLY HAVING AN ANGLED PLATE AND FABRICATION METHODS

(71) Applicant: GLOBALFOUNDRIES U.S. Inc., Santa Clara, CA (US)

(72) Inventors: Nicholas Shellenberger, Malta, NY (US); Michael Scalise, Malta, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 96 days.

(21) Appl. No.: 17/226,087

(22) Filed: Apr. 9, 2021

(65) Prior Publication Data
US 2022/0325839 A1    Oct. 13, 2022

(51) Int. Cl.
*F16L 41/08*  (2006.01)
*F16L 41/02*  (2006.01)

(52) U.S. Cl.
CPC ............... *F16L 41/08* (2013.01); *F16L 41/02* (2013.01)

(58) Field of Classification Search
CPC ....... F16L 41/02; F16L 41/021; F16L 41/023; F16L 41/03; F16L 55/02718; F16L 55/02727; F16L 55/02781; F16L 55/027; F15D 1/025; G01F 1/42; E03C 2001/1206; E03C 1/12; Y10T 137/85938
USPC ...................................................... 285/129.1
See application file for complete search history.

(56) References Cited

U.S. PATENT DOCUMENTS

| | | | | |
|---|---|---|---|---|
| 614,464 A * | 11/1898 | Gustafson | ............... | F16L 41/02 285/422 |
| 2,728,599 A * | 12/1955 | Moore | .................... | E21B 27/00 294/86.11 |
| 2,882,993 A * | 4/1959 | Murty | ............... | F16L 55/02718 454/906 |
| 3,349,803 A * | 10/1967 | Bourgeois | ............. | F16L 41/021 138/37 |
| 3,825,286 A * | 7/1974 | Henry, III | ............. | F16L 41/023 285/38 |
| 4,730,808 A * | 3/1988 | Shaw | ........................ | F16K 3/02 251/328 |
| 4,874,012 A * | 10/1989 | Velie | ....................... | F16K 17/34 137/557 |

(Continued)

FOREIGN PATENT DOCUMENTS

| | | | | |
|---|---|---|---|---|
| CN | 1259517 C | * | 6/2006 | ............... D06B 5/16 |
| CN | 202658674 U | * | 1/2013 | |

(Continued)

OTHER PUBLICATIONS

Jim Gordon, "Plastic Drainage Pipes—What Are the Different Types and Strengths?", Sep. 21, 2020, "https://web.archive.org/web/20200921052643/https://westchestermachinery.com/plastic-drainage-pipes-what-are-the-different-types-strengths/" (Year: 2020).*

(Continued)

*Primary Examiner* — Zachary T Dragicevich
*Assistant Examiner* — Alexander T Rufrano
(74) *Attorney, Agent, or Firm* — David Cain

(57) ABSTRACT

A pipe assembly is provided, the pipe assembly comprising a first pipe having a side opening on a side surface of the first pipe. A plate in the first pipe is arranged adjacent to the side opening and at an angle relative to a radial axis of the first pipe such that a first side of the plate may be lower than a second side. A vent hole may be proximal the side opening on the side surface of the first pipe.

20 Claims, 8 Drawing Sheets

(56) References Cited

U.S. PATENT DOCUMENTS

| | | | | |
|---|---|---|---|---|
| 5,341,848 A | * | 8/1994 | Laws | F16L 55/02718 138/40 |
| 5,593,131 A | * | 1/1997 | Briggs, Jr. | F23K 3/02 251/117 |
| 6,289,935 B1 | * | 9/2001 | Tash | F16L 55/105 138/97 |
| 7,021,336 B2 | * | 4/2006 | Burrows | F16L 41/021 285/132.1 |
| 8,181,671 B2 | * | 5/2012 | Butler | F16L 55/02709 181/258 |
| 9,200,650 B2 | * | 12/2015 | Van Buskirk | F15D 1/025 |
| 9,856,893 B2 | * | 1/2018 | Goodwin | F15D 1/025 |
| 10,533,400 B2 | * | 1/2020 | Rogers | B01D 17/045 |
| 10,552,552 B2 | * | 2/2020 | Lawson | F16L 23/006 |
| 10,703,500 B2 | * | 7/2020 | Rhoden | F16L 53/32 |
| 11,359,652 B2 | * | 6/2022 | Van Buskirk | F15D 1/001 |
| 2010/0230962 A1 | | 9/2010 | Bongiorno | |
| 2011/0061757 A1 | * | 3/2011 | Butler | F16L 55/02709 138/40 |
| 2011/0108125 A1 | * | 5/2011 | Corn | F16L 41/021 285/133.11 |
| 2011/0180276 A1 | * | 7/2011 | Khalil | F15D 1/14 169/16 |
| 2013/0134705 A1 | | 5/2013 | Ficker et al. | |
| 2017/0299104 A1 | * | 10/2017 | Yang | F16L 55/02718 |

FOREIGN PATENT DOCUMENTS

| | | | | | |
|---|---|---|---|---|---|
| CN | 207906683 U | * | 9/2018 | | |
| CN | 208670386 U | * | 3/2019 | | |
| CN | 208844675 U | * | 5/2019 | | |
| CN | 209194649 U | * | 8/2019 | | |
| CN | 212929114 U | * | 4/2021 | | |
| CN | 213625863 U | * | 7/2021 | | |
| CN | 106759689 B | * | 9/2022 | | E03C 1/12 |
| GB | 2395538 A | * | 5/2004 | | D06B 23/00 |
| JP | 2010255348 A | * | 11/2010 | | |
| KR | 20180013282 A | | 2/2018 | | |

OTHER PUBLICATIONS

Ecoflow Flanged Venturi Orifice Steam Trap, 2019, EBE Engineering, Retrieved from https://www.ebe-eng.com/pages/flanged.

* cited by examiner

PIPE ASSEMBLY HAVING AN ANGLED PLATE AND FABRICATION METHODS

FIELD OF THE INVENTION

The disclosed embodiments relate generally to a pipe assembly, and more particularly, to a pipe assembly having an angled plate and fabrication methods.

BACKGROUND

Semiconductor processing for patterning a device feature may include dry etch processes which may generate residue. The residue generated by the dry etch process may be removed from the etching chamber together with the exhaust gas via a pump connected to the chamber. An orifice plate in a pipe assembly connected to the pump may be used to filter out large particles in the residue generated during the etching process. The orifice plate may refer to a plate having an orifice.

The large particles in the residue may obstruct the orifice plate in the pipe assembly. The pipe assembly may be connected to an abatement head for removal of harmful gases from the exhaust gas prior to releasing it to the atmosphere. The abatement head may be a scrubber or a convection oven. The obstruction of the orifice plate in the pipe assembly may cause a spike in an exhaust pressure of the pump, subsequently causing the pump to fail. Thus, there is a need to overcome the challenges mentioned above.

SUMMARY

In an aspect of the present disclosure, a pipe assembly is provided. The pipe assembly comprises a first pipe having a side opening on a side surface of the first pipe. A plate in the first pipe may be arranged adjacent to the side opening and at an angle to a radial axis of the first pipe such that a first side of the plate may be lower than a second side. A vent hole may be proximal the side opening on the side surface of the first pipe.

In another aspect of the present disclosure, a pipe assembly is provided. The pipe assembly comprises a first pipe having a side opening on a side surface of the first pipe. A second pipe may be connected to the first pipe at the side opening. A plate in the first pipe may be arranged at an angle to a radial axis of the first pipe such that a first side of the plate may be lower than a second side of the plate. The plate and a bottom surface of the second pipe may be arranged in a continuous plane. A vent hole may be proximal the side opening on the side surface of the first pipe.

In yet another aspect of the present disclosure, a method of fabricating a piping is provided. The method comprises providing a first pipe having a side opening on a side surface of the first pipe. A plate may be attached in the first pipe, whereby the plate may be arranged adjacent to the side opening and at an angle to a radial axis of the first pipe such that a first side of the plate may be lower than a second side. A vent hole may be formed proximal the side opening on the side surface of the first pipe.

Numerous advantages may be derived from the embodiments described below. The embodiments provide a pipe assembly having a plate angled relative to a radial axis of a first pipe that redirects large particles from an etching process residue to a second pipe and a collection reservoir, thereby preventing obstruction of a vent hole and an abatement head connected to the first pipe. The exhaust pressure of a pump connected to the first pipe is maintained at a consistent level thereby increasing the pump lifetime. Interruptions to an etching process between scheduled chamber maintenance are reduced or eliminated leading to cost savings. Chamber maintenance is thereby minimized and labor efficiency is increased.

BRIEF DESCRIPTION OF THE DRAWINGS

The disclosed embodiments will be better understood from a reading of the following detailed description, taken in conjunction with the accompanying drawings.

Figure 1A:
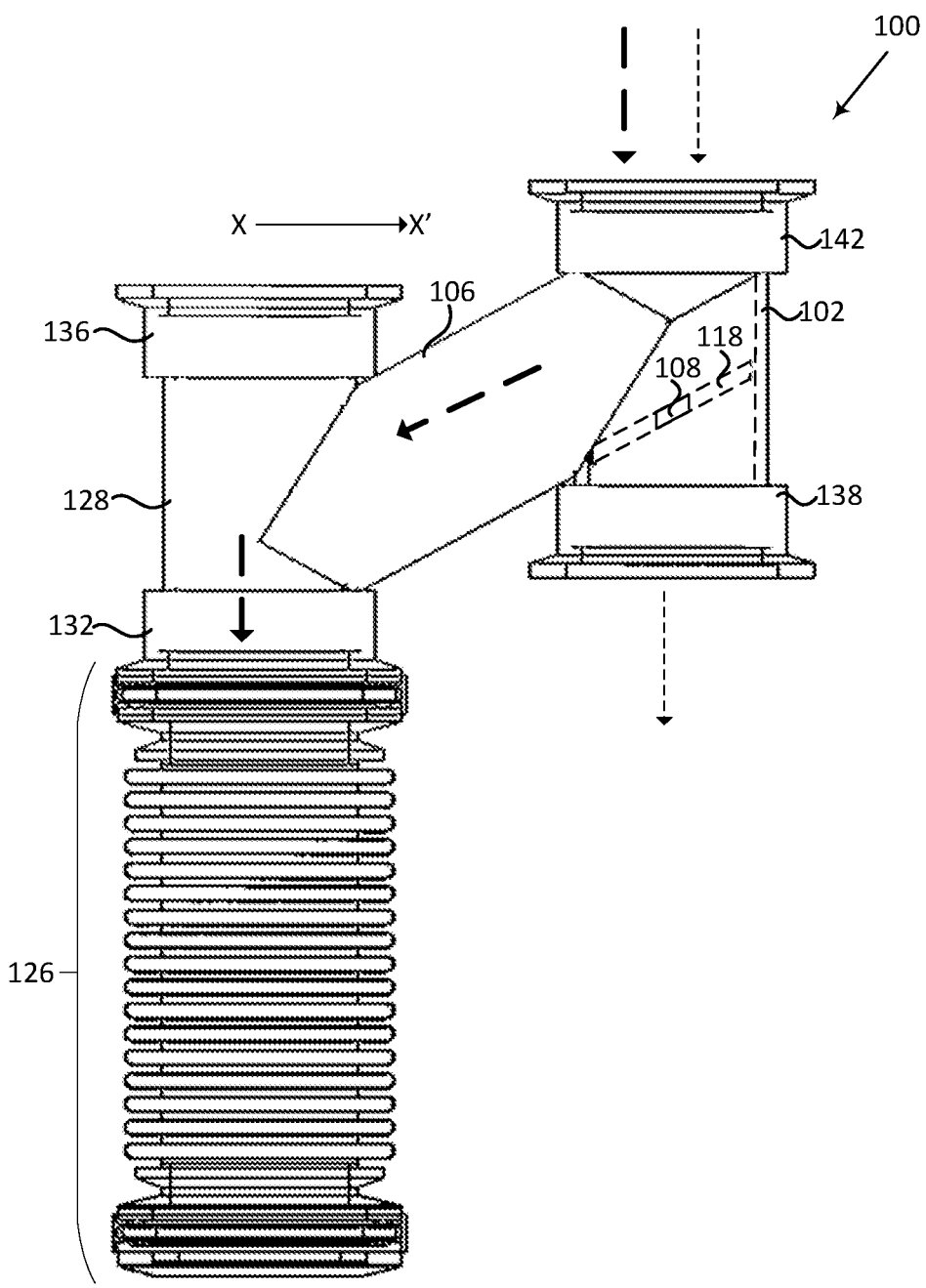
FIG. 1A illustrates a side view of a pipe assembly, according to an embodiment of the disclosure.

For simplicity and clarity of illustration, the drawings illustrate the general manner of construction, and certain descriptions and details of well-known features and techniques may be omitted to avoid unnecessarily obscuring the discussion of the described embodiments of the devices. Additionally, elements in the drawings are not necessarily drawn to scale. For example, the dimensions of some of the elements in the drawings may be exaggerated relative to other elements to help improve understanding of embodiments of the devices. The same reference numerals in different drawings denote the same elements, while similar reference numerals may, but do not necessarily, denote similar elements.

DETAILED DESCRIPTION

The following detailed description is exemplary in nature and is not intended to limit the devices or the application and uses of the devices. Furthermore, there is no intention to be bound by any theory presented in the preceding background of the devices or the following detailed description.

FIG. 1A illustrates a side view of a pipe assembly 100, according to an embodiment of the disclosure. Referring to FIG. 1A, the pipe assembly 100 may include a first pipe 102 connected to one end of a second pipe 106, and a third pipe 128 connected to the other end of the second pipe 106. A plate 118 having a vent hole 108 may be arranged in the first pipe 102. The plate 118 and the vent hole 108 are shown in the side view with dotted lines to illustrate an example of the pipe assembly 100. The third pipe 128 may also be connected to a collection reservoir 126.

A possible set up and operation of the pipe assembly 100 is described below. A flange 142 may connect a top end of the first pipe 102 to a semiconductor equipment, for example, an etching chamber or any other suitable machine or apparatus that generates particles and/or gas. A flange 138 may connect a bottom end of the first pipe 102 to an abatement head or any other suitable machine or apparatus for removal of particles or gas. An exhaust gas generated during an etching operation may flow from the etching chamber to the first pipe 102. The exhaust gas may contain a mixture of large and small particles. The large particles, represented by a thick dashed arrow, may be prevented from passing through the vent hole 108 and may travel through the second pipe 106 and the third pipe 128 to the collection reservoir 126. The small particles, represented by a thin dashed arrow, may pass through the vent hole 108 and to the abatement head (not shown). With the above-described assembly, the potential obstruction of the vent hole 108 may be prevented by the large particles being channeled away through the second pipe 106 instead of passing through vent hole 108.

Figure 1B:
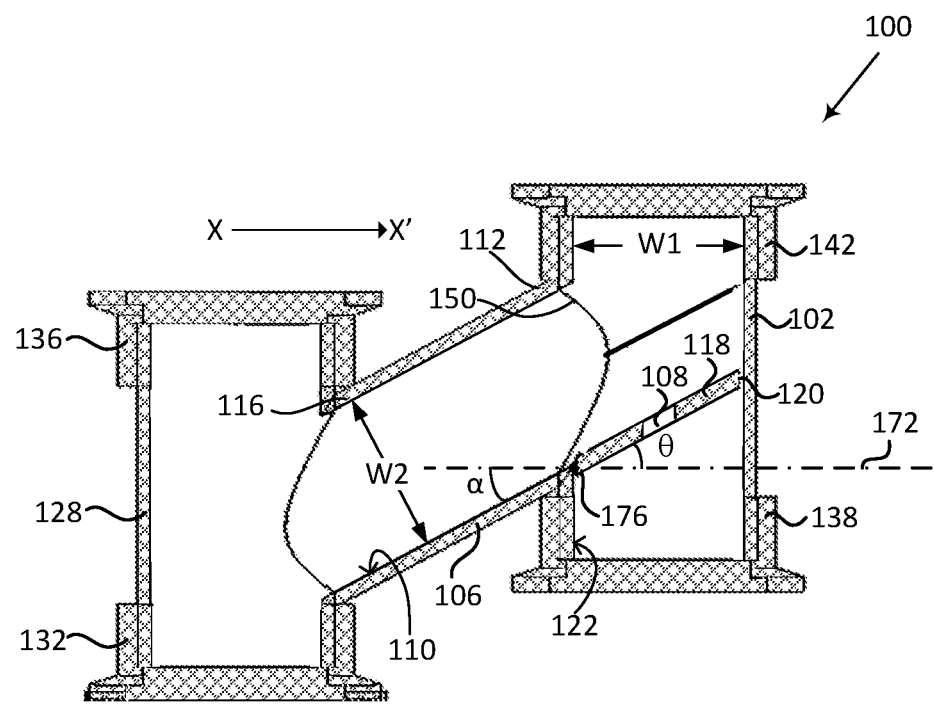
FIG. 1B illustrates a cross-section view of a pipe assembly, according to an embodiment of the disclosure.

FIG. 1B illustrates a cross-section view of the pipe assembly 100, according to an embodiment of the disclosure. Referring to FIG. 1B, the pipe assembly 100 may include the first pipe 102 having a side opening 150 on a side surface of the first pipe 102. The second pipe 106 may be connected to the first pipe 102 at the side opening 150 on the side surface of the first pipe 102. The first pipe 102 may be made of stainless steel, or any other suitable metal. The second pipe 106 may be made of stainless steel, or any other suitable metal. In one embodiment, the first pipe 102 and the second pipe 106 may be made of the same material. In another embodiment, the first pipe 102 and the second pipe 106 may be made of different materials. The plate 118 may be arranged at an angle to a radial axis 172 of the first pipe 102. The term "radial axis" may refer to an axis along a radius of a cross-section of the first pipe 102. Axis 172 may be perpendicular to a rotational axis of the first pipe 102. The plate 118 may be arranged in the first pipe 102 and proximal a bottom surface 110 of the second pipe 106. A first side 176 of the plate 118 may be lower than a second side 120. The first side 176 of the plate 118 may be arranged adjacent to the side opening 150. In a preferred embodiment, the plate 118 and the bottom surface 110 of the second pipe 106 may be arranged in a continuous plane. In an alternative embodiment, the plate 118 and the bottom surface 110 of the second pipe 106 may be approximately parallel and may be placed on different planes. For example, the bottom surface 110 of the second pipe 106 may be placed lower than a bottom rim of the side opening 150.

In one embodiment, the vent hole 108 may be located proximal a center portion of the plate 118. In an alternative embodiment, the vent hole 108 may be located proximal a side portion of the plate 118. In yet another embodiment, the plate 118 may have a smaller surface area than a cross-sectional area of the first pipe 102 such that an opening is formed between the plate 118 and a side surface 122 of the first pipe 102. The cross-sectional area of the first pipe 102 may be taken at an angle parallel to the radial axis 172 of the first pipe 102. In one embodiment, the plate 118 may be arranged next to the bottom surface 110 of the second pipe 106. The first pipe 102 may have a top end and a bottom end opposite to the top end. The first pipe 102 may have an internal width W1 parallel to the radial axis 172 of the first pipe 102.

The second pipe 106 may be positioned at an angle relative to the first pipe 102. For example, the bottom surface 110 of the second pipe 106 may be at an angle α to the radial axis 172 of the first pipe 102. Angle α may be more than zero degrees. For example, the second pipe 106 may include a first end 112 and a second end 116 opposite to the first end 112. The first end 112 may be placed higher than the second end 116. In one embodiment, the first end 112 may be arranged next to the plate 118. The first end 112 may be placed next to the side opening 150 in the side surface of the first pipe 102. In a preferred embodiment, the first end 112 may be arranged next to the first side 176 of the plate 118. Although not shown, in another embodiment, the second end 116 of the second pipe 106 may be curved downwards to connect directly with the collection reservoir 126.

The second pipe 106 may include an internal width W2. The internal width W2 may be substantially similar at both ends 112 and 116, or may differ with one end being wider than the other end. In one embodiment, the internal width W2 may be at least equal to the internal width W1 to provide a good flow for large particles and gas. The collection reservoir 126 may be arranged next to the second end 116 of the second pipe 106. In one embodiment, the collection reservoir 126 may be a bellows. The term "bellows" may refer to an expansion joint that absorbs movement in a pipe system. In one embodiment, the collection reservoir 126 may be made of stainless steel or any other suitable metal.

The third pipe 128 may be arranged between the collection reservoir 126 and the second pipe 106. A flange 132 may connect the collection reservoir 126 to the third pipe 128. The third pipe 128 may have an upper end and a lower end opposite the upper end. An internal width of the lower end of the third pipe 128 may be at least equal to the internal width W1 of the first pipe 102. In one embodiment, the third pipe 128 may be substantially similar to the first pipe 102 and flipped 180°. In another embodiment, the third pipe 128 may be different from the first pipe 102. For example, an internal width of the upper end of the third pipe 128 may be different from the internal width of the bottom end of the first pipe 102. The third pipe 128 may be made of stainless steel, or any other suitable metal. In a preferred embodiment, the third pipe 128 may be made of the same material as the first 102 or second 106 pipes. In an alternative embodiment, the third pipe 128 may be made of a different material from the first 102 or second 106 pipes.

The second end 116 of the second pipe 106 may be arranged next to an opening in a side surface of the third pipe 128. The opening in the side surface of the third pipe 128 is shown by a curved outline. The second end 116 of the second pipe 106 may be arranged between the upper end and the lower end of the third pipe 128. A flange 132 may be arranged over the lower end of the third pipe 128 and a flange 136 may be arranged over the upper end of the third pipe 128. The flange 132 or 136 may be used to connect to other pipes or another object. The first end 112 of the second pipe 106 may be arranged between the top end of the first pipe 102 and the bottom end of the first pipe 102.

Figure 2:
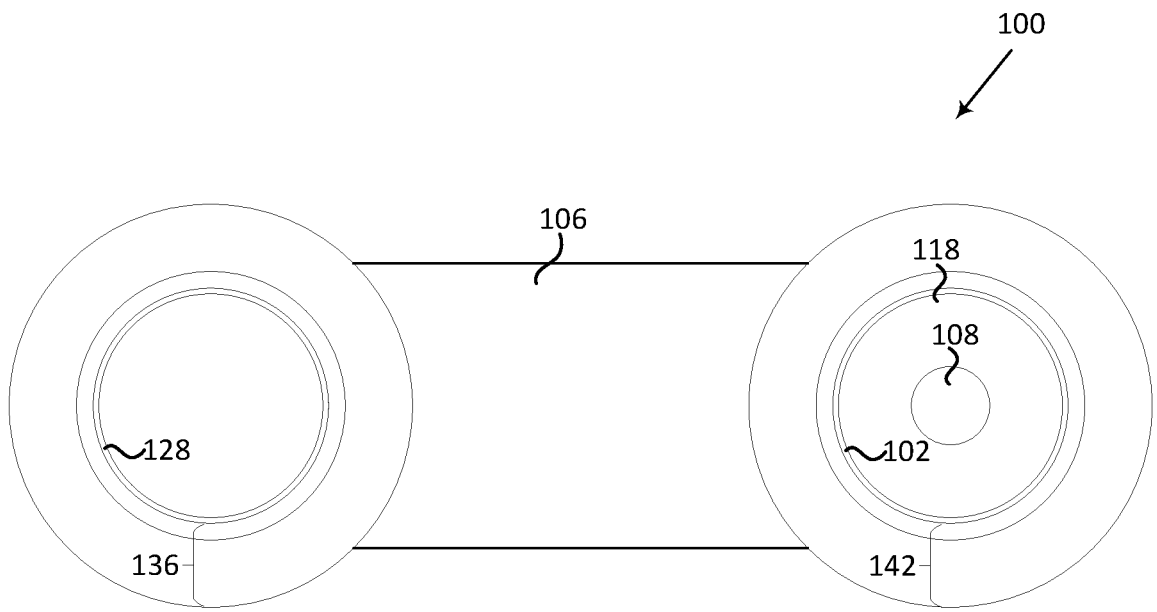
FIG. 2 illustrates a top view of the pipe assembly shown in FIG. 1B, according to an embodiment of the disclosure.

FIG. 2 illustrates a top view of the pipe assembly 100 shown in FIG. 1B, according to an embodiment of the disclosure. From a top down perspective, the first pipe 102 may be circular, elliptical, or any other suitable shape. The third pipe 128 may be circular, elliptical, or any other suitable shape. In one embodiment, the first 102 and the third 128 pipes may have the same shape. In another embodiment, the first 102 and the third 128 pipes may have different shapes. The flanges 136 and 142 may surround the third pipe 128 and the first pipe 102, respectively. The vent hole 108 may be arranged in the plate 118. At least part of a perimeter of the plate 118 may be adjacent to a side surface of the first pipe 102. For example, in one embodiment, the perimeter of the plate 118 may be adjacent to the side surface of the first pipe 102, and the plate 118 may have a vent hole 108 in the plate 118. In an alternative embodiment, part of the perimeter of the plate 118 may be adjacent to a portion of the side surface of the first pipe 102, with the plate 118 having a notch thereby forming a vent hole 108 between the plate 118 and another portion of the side surface of the first pipe 102.

Figure 3A:
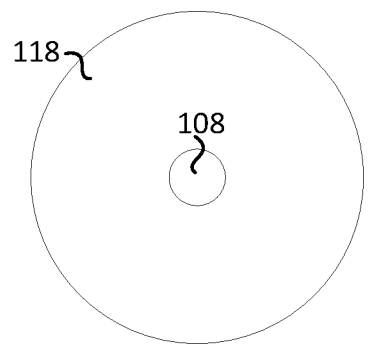
FIG. 3A illustrates a top view of a plate and a vent hole, according to an embodiment of the disclosure.

FIG. 3A illustrates a top view of the plate 118 and the vent hole 108, according to an embodiment of the disclosure. The plate 118 may be circular, elliptical, or any other suitable shape. The vent hole 108 may be circular, elliptical, or any other suitable shape. In one embodiment, the plate 118 and the vent hole 108 may have the same shape. In another embodiment, the plate 118 and the vent hole 108 may have different shapes. In yet another embodiment, a width of the plate 118 may be smaller than the internal width W1 of the first pipe 102 such that an opening may be formed proximal a side surface 122 of the first pipe 102. For example, a side surface of the plate 118 may have a notch or a cut-out portion.

Figure 3B:
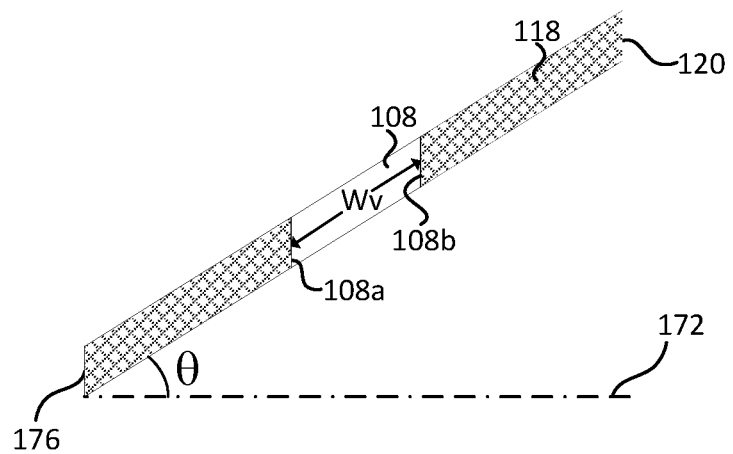
FIG. 3B illustrates a cross-section view of the plate and the vent hole shown in FIG. 3A, according to an embodiment of the disclosure.

FIG. 3B illustrates a cross-section view of the plate 118 and the vent hole 108 shown in FIG. 3A, according to an embodiment of the disclosure. The plate 118 and the vent hole 108 may be placed at an angle θ with respect to the radial axis 172 of the first pipe 102. For example, the angle θ may range between ten (10) to sixty (60) degrees, with a preferred range between twenty five (25) to forty (40) degrees. It should be appreciated that the ranges specified above are exemplary and are not limiting. In an embodiment, angle θ may be approximately equal to angle α shown in FIG. 1B. Referring to FIG. 3B, in one embodiment, the cross-section view of the plate 118 including the first side 176, the second side 120, the top surface and the bottom surface of the plate 118 may be in the shape of a parallelogram, with the first side 176 parallel to the second side 120. In another embodiment, the first side 176 of the plate 118 may not be parallel to the second side 120. For example, the first side 176 of the plate 118 may be arranged at a different angle to the radial axis 172 compared to the second side 120. In yet another embodiment, the plate 118 may have a top surface approximately parallel to a bottom surface and rounded side surfaces. In yet another embodiment, the cross-section view of the plate 118 including the first side 176, the second side 120, the top surface and the bottom surface of the plate 118 may be in the shape of a rectangle.

The vent hole 108 may have a first side surface 108a and a second side surface 108b. The first and second side surfaces, 108a and 108b, respectively, may be substantially at right angles to the surface of the plate 118 or may be slanted at an angle more or less than 90 degrees to the surface of the plate. In a preferred embodiment, the first and second side surfaces, 108a and 108b, respectively, may be substantially parallel to the first and second sides, 176 and 120, respectively, of the plate 118. The first and second sides, 176 and 120, respectively, of the plate 118 may be substantially perpendicular to the radial axis 172, for ease of alignment in the first pipe 102. In another embodiment, the vent hole 108 may be a funnel shape, having a top width smaller than a bottom width. In yet another embodiment, there may be at least two vent holes 108 arranged in the plate 118. The first side surface 108a may be arranged lower than the second side surface 108b. The first side surface 108a of the vent hole 108 may be proximal the side opening 150 on the side surface of the first pipe 102 and the bottom surface 110 of the second pipe 106.

The vent hole 108 may include a width Wv measured from the first side surface 108a to the second side surface 108b. In the case where the side surfaces 108a and 108b are slanted with respect to the surface of the plate 118, i.e. not set at right angles to the surface plane, the width Wv may be one of the largest measurements between the first side surface 108a and the second side surface 108b. The width Wv may have a range not limited to between 6 millimeters and 7 millimeters. In another case, for example, when the vent hole 108 is not circular, the width Wv may also be one of the largest measurements between the first side surface 108a and the second side surface 108b. In other words, the width Wv may represent the largest measurement across the vent hole 108.

FIGS. 4A, 4B, 5A, 5B, and 6 to 8 illustrate a process flow for fabricating the pipe assembly 100 shown in FIG. 1B, according to some embodiments of the disclosure. In an alternative embodiment, the pipe assembly 100 may be fabricated by 3-D printing.

Figure 4A:
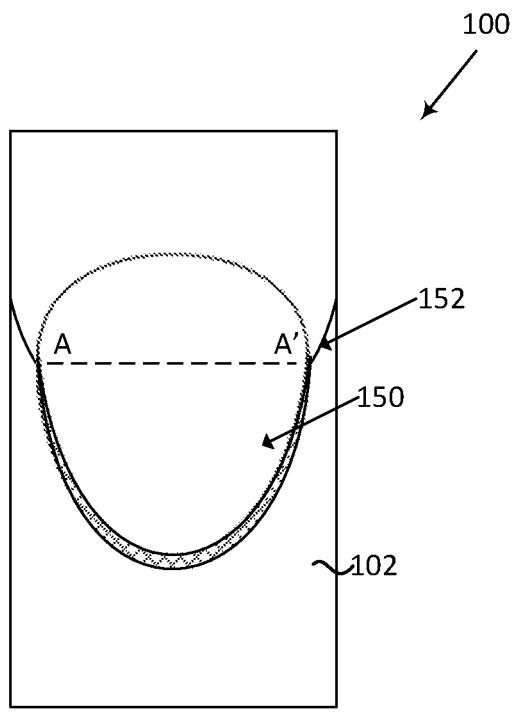
FIGS. 4A, 4B, 5A, 5B, and 6 to 8 illustrate a process flow for fabricating the pipe assembly shown in FIG. 1B, according to some embodiments of the disclosure.

FIG. 4A illustrates a front view of a partially completed pipe assembly 100 including the first pipe 102, a cut 152 and a side opening 150 on a side surface of the first pipe 102, according to an embodiment of the disclosure. Referring to FIG. 4A, the side opening 150 may be made in the first pipe 102 by drilling or any other suitable method. A dashed line A-A' indicates a width of the side opening 150. In one embodiment, the side opening 150 may have a shape of two half ellipses merged along the line A-A'. In another embodiment, the side opening 150 may be a circle or any other suitable shape. A cut 152 may be made in the first pipe 102 to separate the first pipe 102 into an upper portion and a lower portion. The cut 152 may be made at the width of the side opening 150.

Figure 4B:
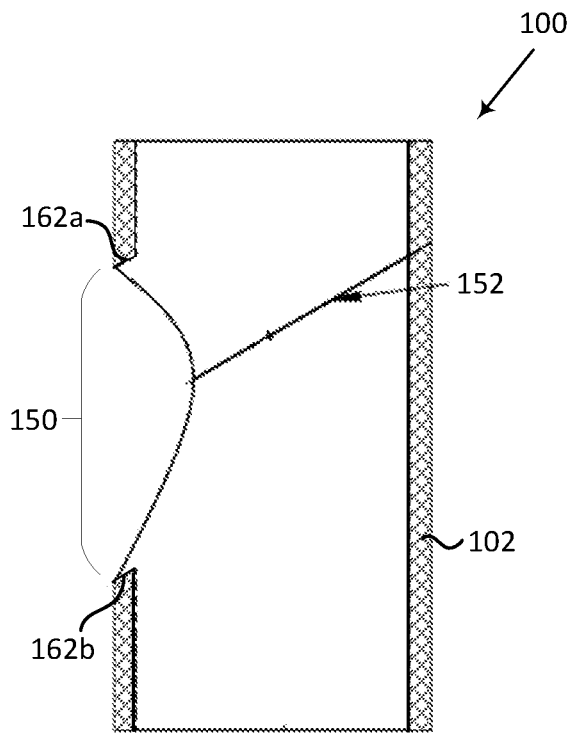

FIG. 4B illustrates a cross section view of the partially completed pipe assembly 100 shown in FIG. 4A, according to an embodiment of the disclosure. Referring to FIG. 4B, in one embodiment, the cut 152 may be arranged at the angle θ with respect to the radial axis 172 of the first pipe 102 for ease of placing the plate 118 in the first pipe 102. In an alternative embodiment, the cut 152 may not be made in the first pipe 102, for example, when the pipe assembly 100 is 3-D printed. In a preferred embodiment, an upper rim 162a and a lower rim 162b of the side opening 150 may be sloped at substantially similar angles to the angle α to allow a better fit of a second pipe 106. An outer perimeter of the side opening 150 may have a concave shape.

Figure 5A:
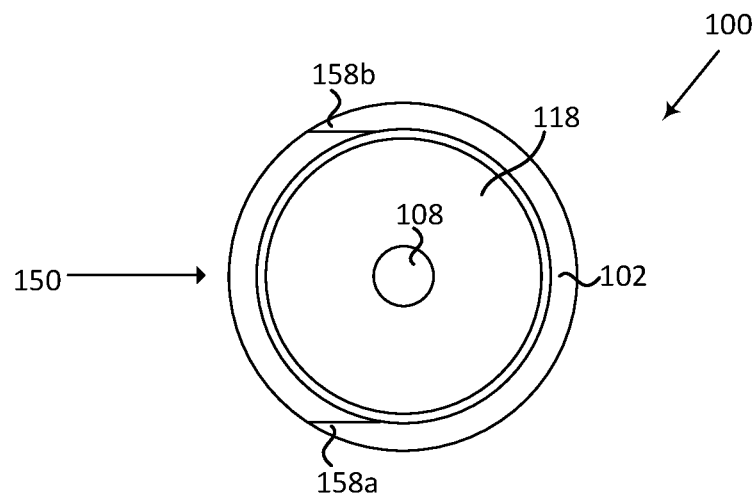
Figure 5B:
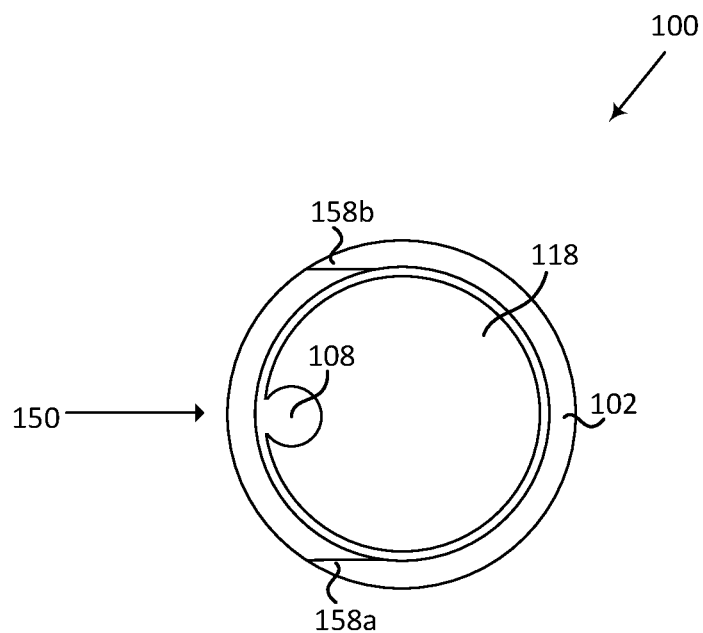

FIG. 5A illustrates a top view of the lower portion of the first pipe 102 after attachment of a plate 118 having a vent hole 108, according to an embodiment of the disclosure. The plate 118 may be attached by welding or any other suitable attachment methods to the first pipe 102. Even though a gap is shown between the plate 118 and the first pipe 102, the gap may be filled by a weld material to attach the plate 118 to the first pipe 102. Lines 158a and 158b indicate a top rim of the side opening 150. A perimeter of the plate 118 may be adjacent to an inner perimeter of the first pipe 102. A width of the plate 118 may be smaller than or equal to a width of the side opening 150. The width of the side opening 150 is indicated by a distance between lines 158a and 158b. In one embodiment, the vent hole 108 in the plate 118 may be formed by drilling or any other suitable method. The vent hole 108 may be placed proximal the side opening 150. In an alternative embodiment shown in FIG. 5B, the vent hole 108 may be formed by making a cut-out portion or a notch at an edge portion of the plate 118, such that the vent hole 108 is formed between the plate 118 and a side surface of the first pipe 102.

Figure 6:
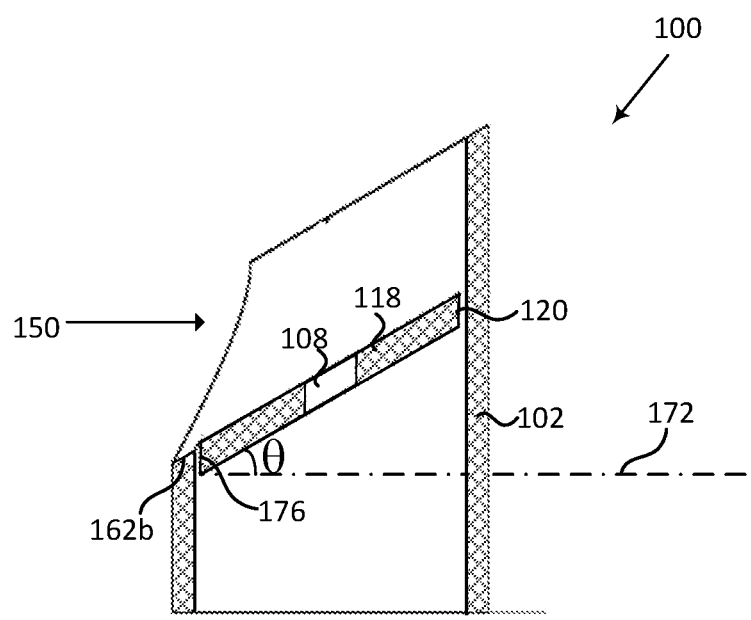

FIG. 6 illustrates a cross-section view of the lower portion of the first pipe 102 shown in FIG. 5A, according to an embodiment of the disclosure. Referring to FIG. 6, the plate 118 may be arranged at approximately the angle θ to the radial axis 172 of the first pipe 102 such that a first side 176 of the plate 118 is lower than a second side 120. The first side 176 of the plate 118 may be adjacent to the lower rim 162b of the side opening 150.

Figure 7:
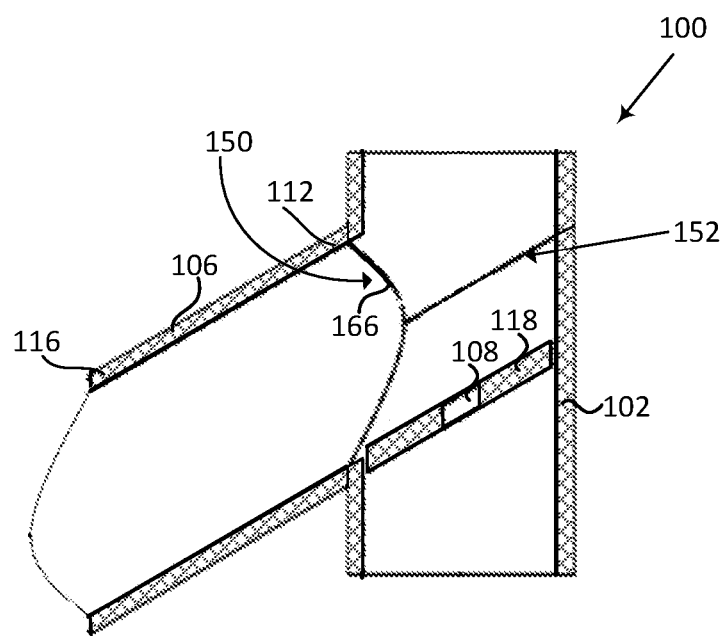

FIG. 7 illustrates a cross-section view of the partially completed pipe assembly 100 after attaching an upper portion of the first pipe 102 to the lower portion of the first pipe 102 and a second pipe 106 to the first pipe 102, according to an embodiment of the disclosure. The attachment may be made by welding, or any other suitable attachment method. The attachment of a first end 112 of the second pipe 106 to cover the side opening 150 in the first pipe 102 may be made by welding, or any other suitable attachment method. A cross-section of the second pipe 106 may be circular, elliptical, or any other suitable shapes. In one embodiment, the first end 112 of the second pipe 106 may have an angular outer portion (not shown) and a curved inner portion 166 to complement a curvature of the first pipe 102 thereby forming a tight seal. The curved inner portion 166 of the second pipe 106 may complement a shape of the outer circumference of the side opening 150 in the first pipe 102. Although not shown, from a top down perspective, a portion of the second pipe 106 proximal the first pipe 102 may have a semi-circular shape wrapping around the first pipe 102. When viewed from the bottom, a portion of the second pipe 106 proximal the first pipe 102 may have a semi-circular shape wrapping around the first pipe 102. In a preferred embodiment, a first end 112 of the second pipe 106 may have the same shape as the second end 116 and flipped 180°. In an alternative embodiment, the first end 112 of the second pipe 106 may have a different shape from the second end 116.

Figure 8:
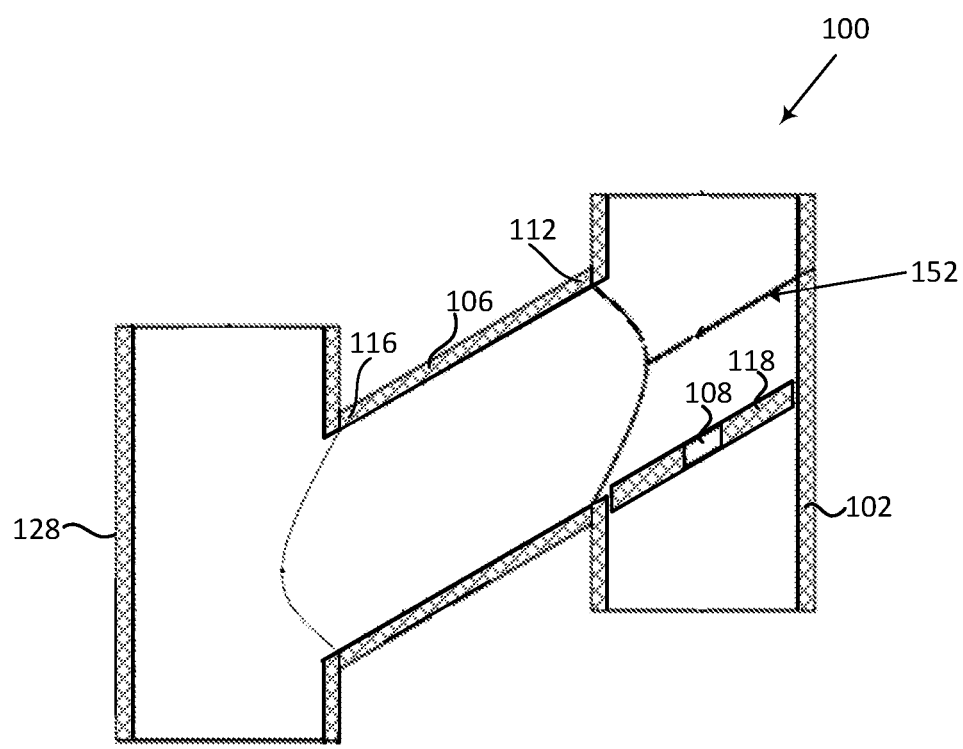

FIG. 8 illustrates a cross-section view of the partially completed pipe assembly 100 after attaching a third pipe 128 to the second end 116 of the second pipe 106, according to an embodiment of the disclosure. In a preferred embodiment, the third pipe 128 may have the same shape as the first pipe 102 and flipped 180°. For example, the shape of a side opening in the third pipe 128 may be similar to the shape of the side opening 150 in the first pipe 102. Thereby, the third pipe 128 may be fabricated in the same manner as the first pipe 102 as shown in FIGS. 4A and 4B, without the cut 152. In an alternative embodiment, the third pipe 128 may have a different shape from the first pipe 102. The third pipe 128 may be attached to the second pipe 106 by welding, or any other suitable attachment method.

The process continues to form the pipe assembly 100 shown in FIG. 1B. A flange 132 may be attached to a lower end of the third pipe 128. A flange 136 may be attached to an upper end of the third pipe 128. A flange 138 may be attached to a bottom end of the first pipe 102. A flange 142 may be attached to a top end of the first pipe 102. The flanges 132, 136, 138 and 142 may be attached by welding, or any other suitable attachment method.

The terms "first", "second", "third", and the like in the description and in the claims, if any, are used for distinguishing between similar elements and not necessarily for describing a particular sequential or chronological order. It is to be understood that the terms so used are interchangeable under appropriate circumstances such that the embodiments of the device described herein are, for example, capable of operation in sequences other than those illustrated or otherwise described herein. The terms "left", "right", "front", "back", "top", "bottom", "over", "under", and the like in the description and in the claims, if any, are used for descriptive purposes and not necessarily for describing permanent relative positions. It is to be understood that the terms so used are interchangeable under appropriate circumstances such that the embodiments of the device described herein are, for example, capable of operation in other orientations than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise", "include", "have", and any variations thereof, are intended to cover a non-exclusive inclusion, such that a process, method, article, or device that comprises a list of elements is not necessarily limited to those elements, but may include other elements not expressly listed or inherent to such process, method, article, or device.

While several exemplary embodiments have been presented in the above detailed description of the device, it should be appreciated that number of variations exist. It should further be appreciated that the embodiments are only examples, and are not intended to limit the scope, applicability, dimensions, or configuration of the devices in any way. Rather, the above detailed description will provide those skilled in the art with a convenient road map for implementing an exemplary embodiment of the devices, it being understood that various changes may be made in the function and arrangement of elements and method of fabrication described in an exemplary embodiment without departing from the scope of this disclosure as set forth in the appended claims.

What is claimed:

1. A pipe assembly comprising:
   a first pipe having a side opening on a side surface of the first pipe;
   a plate in the first pipe arranged adjacent to the side opening, the plate including a first side, a second side, a top surface, and a bottom surface, wherein the first and second sides of the plate are perpendicular to a radial axis of the first pipe and the top surface of the plate is at an angle to the radial axis of the first pipe;
   a second pipe next to the side opening on the side surface of the first pipe, the second pipe has a bottom surface, the bottom surface of the second pipe is at an angle of more than zero degrees to the radial axis of the first pipe, wherein the angle between the bottom surface of the second pipe and the radial axis of the first pipe is approximately equal to the angle between the top surface of the plate and the radial axis of the first pipe, and wherein the bottom surface of the second pipe is parallel to the top surface of the plate; and
   a vent hole proximal to the side opening on the side surface of the first pipe.

2. The pipe assembly of claim 1, wherein the vent hole is in the plate.

3. The pipe assembly of claim 1, wherein the second pipe is connected to the side opening of the first pipe and a first side surface of the vent hole is proximal to the bottom surface of the second pipe.

4. The pipe assembly of claim 3, wherein a first end of the second pipe is next to the first side surface of the vent hole.

5. The pipe assembly of claim 1, wherein a width of the vent hole is smaller than a width of a top end of the first pipe.

6. The pipe assembly of claim 3, wherein a second end of the second pipe is curved downwards and connects directly with a collection reservoir.

7. The pipe assembly of claim 1, wherein at least part of a perimeter of the plate is adjacent to the side surface of the first pipe.

8. The pipe assembly of claim 3, further comprising:
   a collection reservoir next to a second end of the second pipe.

9. The pipe assembly of claim 8, further comprising:
   a third pipe between the collection reservoir and the second pipe.

10. The pipe assembly of claim 1, wherein the first side of the plate is parallel to the second side, and a cross-section of the plate including the first side, the second side, the top surface, and the bottom surface of the plate form a parallelogram.

11. The pipe assembly of claim 9, wherein the collection reservoir is a bellows and a flange connects the bellows to the third pipe.

12. The pipe assembly of claim 10, wherein a first side surface of the vent hole is parallel to a second side surface of the vent hole, the first side of the plate and the second side of the plate.

13. The pipe assembly of claim 1, wherein the first pipe is connected to a semiconductor equipment.

14. The pipe assembly of claim 1, wherein the plate is placed at an angle between ten to sixty degrees with respect to the radial axis of the first pipe.

15. The pipe assembly of claim 1, wherein the top surface of the plate is above the bottom surface of the second pipe.

16. A pipe assembly comprising:
   a first pipe having a side opening on a side surface of the first pipe;
   a second pipe connected to the first pipe at the side opening, the second pipe has a bottom surface;
   a plate in the first pipe arranged at an angle between ten to sixty degrees with respect to a radial axis of the first pipe, the plate including a first side, a second side, a top surface, and a bottom surface, wherein the first and second sides of the plate are perpendicular to the radial axis of the first pipe, wherein the bottom surface of the second pipe is parallel to the top surface of the plate; and
   a vent hole proximal to the side opening on the side surface of the first pipe.

17. The pipe assembly of claim 16, wherein the bottom surface of the second pipe is arranged at an angle to the radial axis of the first pipe such that the angle between the bottom surface of the second pipe and the radial axis of the first pipe is approximately equal to the angle between the plate and the radial axis of the first pipe.

18. The pipe assembly of claim 16, wherein the vent hole is in the plate.

19. The pipe assembly of claim 17, wherein the top surface of the plate and the bottom surface of the second pipe are arranged in a continuous plane.

20. The pipe assembly of claim 16, wherein the top surface of the plate and the bottom surface of the second pipe are placed on different planes.

* * * * *